United States Patent
Wiler et al.

[11] Patent Number: 5,478,426
[45] Date of Patent: Dec. 26, 1995

[54] METHOD AND APPARATUS FOR ABLATIVE PROCESSING OF ELASTOMERIC PRODUCTS

[75] Inventors: Donna M. Wiler, Akron; Mario N. DeTrano, Massillon; Georg G. A. Bohm, Akron, all of Ohio

[73] Assignee: Bridgestone Corporation, Tokyo, Japan

[21] Appl. No.: 386,220

[22] Filed: Feb. 9, 1995

Related U.S. Application Data

[63] Continuation of Ser. No. 145,114, Nov. 3, 1993, abandoned.
[51] Int. Cl.⁶ ............................................. B32B 31/00
[52] U.S. Cl. ................. 156/272.8; 156/116; 156/277; 156/380.9; 156/388; 152/523; 152/524; 219/121.67; 219/121.72; 219/121.76; 219/121.82; 219/121.85
[58] Field of Search .................. 156/116, 272.8, 156/277, 654, 655, 388, 380.9; 219/121.6, 121.69, 121.67, 121.72, 121.76, 121.82, 121.85; 152/523, 524; 40/596; 428/492, 493, 494, 495

[56] References Cited

U.S. PATENT DOCUMENTS

| | | | |
|---|---|---|---|
| 2,985,216 | 5/1961 | William et al. | 156/277 |
| 3,832,948 | 9/1974 | Barker | 101/401.1 |
| 4,041,652 | 8/1977 | Graven et al. | 156/116 |
| 4,177,233 | 12/1979 | Roberts, Jr. | 156/116 |
| 4,461,795 | 7/1984 | Ogawa . | |
| 4,515,867 | 5/1985 | Bleacher et al. . | |
| 5,061,341 | 10/1991 | Kildal et al. | 156/632 |
| 5,196,228 | 3/1993 | Kirby et al. . | |

FOREIGN PATENT DOCUMENTS

60-187539  9/1985  Japan ....................... 156/116

Primary Examiner—Chester T. Barry
Attorney, Agent, or Firm—Daniel N. Hall

[57] ABSTRACT

A method and an apparatus for ablating selected surfaces of an elastomeric product or an attached work piece. A tire is positioned beneath a laser system such that a laser beam is cast upon the tire sidewall or applied work piece. A microprocessor controls the directing of the laser beam and the position of the tire with respect thereto such that various informational and/or decorative designs and configurations may be ablated into the surface impinged by the laser beam. The dwell time of the laser beam upon the surface and other factors control the depth of ablation. In certain embodiments of the invention, a multi layered work piece is employed such that the depth of ablation will correlate to contrasting or complimentary colors or will effect a desired relief appearance.

17 Claims, 5 Drawing Sheets

| | 1 | 2 | 3 | 4 | 5 |
|---|---|---|---|---|---|
| Chlorobutyl Rubber | 25.0 | 50.0 | | 50.0 | 50.0 |
| Bromobutyl Rubber | | | 90.0 | | |
| Natural Rubber | 30.0 | 30.0 | 10.0 | 30.0 | 30.0 |
| EPDM | 20.0 | 20.0 | | 20.0 | 20.0 |
| Polybutadiene | 25.0 | | | | |
| SBR | | | | | |
| Carbon Black | 30.0 | | 70.0 | | |
| Oil | 10.0 | 3.0 | 11.0 | 3.0 | 3.0 |
| Zinc Oxide | 3.0 | 12.0 | 3.0 | 12.0 | 12.0 |
| MBI5869 (Yellow Pigment) | | 20.0 | | | |
| MCI6653 (Pink Pigment) | | | | | 20.0 |
| Magnesium Oxide | | | 0.15 | | |
| Titanium Dioxide | | | | 35.0 | |
| Magnesium Silicate | | 35.3 | | 23.0 | 35.3 |
| Clay | | 33.7 | | 22.0 | 33.7 |
| Ultramarine Blue | | | | 0.60 | |
| Wax | 3.0 | 2.5 | | 2.5 | 2.5 |
| Magnesium Stearate | | | 0.40 | | |
| Stearic Acid | 1.24 | 0.75 | 2.0 | 1.0 | 0.75 |
| Tackifier Resin | 2.0 | 2.0 | 15.0 | 2.0 | 2.0 |
| Antioxidant | | 1.0 | | 1.0 | 1.0 |
| Sulfur | 2.62 | 0.5 | 0.50 | 0.5 | 0.5 |
| Accelerator | 1.87 | 2.0 | 1.30 | 2.0 | 2.0 |

METHOD AND APPARATUS FOR ABLATIVE PROCESSING OF ELASTOMERIC PRODUCTS

This is a continuation of application Ser. No. 08/145,114, filed Nov. 3, 1993, now abandoned.

TECHNICAL FIELD

The invention herein resides in the art of the manufacture of elastomeric products, such as pneumatic tires and the like. Particularly, the invention relates to the generation of decorative and/or informational designs and configurations in an elastomeric product. Specifically, the invention provides for the use of a laser to ablate elastomeric materials to generate such decorative and/or informational designs in a substrate of the product.

BACKGROUND ART

It has previously been known to provide pneumatic tires with decorative sidewalls in various configurations. Raised letters or logos molded onto the sidewall of the tire have been commonplace. Additionally, for years it has been known to provide a decorative band about the sidewall of the tire and concentric with the axis thereof to provide "whitewall" tires. Such bands have often been provided by imbedding a laminate having a white elastomeric face within the sidewall of the tire which is later ground and buffed to expose the same. However, such a process is expensive and time consuming.

It has also been known in the art to bond a decorative applique to the tire sidewall. In some instances, the applique has been of an uncured or partially cured nature, applied to the tire within the tire mold and vulcanized thereto during the curing process. It is further known to provide such appliques in a cured state for subsequent adhesive attachment to the tire. While such processes have generally been acceptable from the standpoint of cost effectiveness and maintenance of tire integrity, improvements in the realm of processability, configuration resolution, and design availability are still needed. Indeed, the range of decorative features that may be added to the tires by means of molding or appliques has been quite restricted.

It has further been known in the art to provide informational material upon a tire by means of molding, :the adherence of appliques, branding, or the like. Such informational material has included serial numbers, manufacturer's codes, and indicia of ownership. Again, the apparatus and technique employed for imparting such information to the tire have generally been time consuming and costly in implementation. This is particularly true when the information is unique to each tire, requiring serial number or code changes from tire to tire during the manufacturing process.

In general, the prior art has taught that any alteration of a pneumatic tire beyond that of a simple "black wall" tire is a costly proposition and subject to limitations of the availability of information or decorations which may be applied. When "whitewalls" are formed by abrading and buffing, marred and scuffed surfaces may result, requiring that the tire be discarded. When such decorative or informational features are molded, they are often characterized by mold flashes or other markings. Further, none of the prior art techniques are given to allowing the customer to choose from a broad range of specific designs or configurations to particularly customize the tire either decoratively or informationally.

While the prior art and the inventive concepts are presented and discussed herein with respect to the manufacture of pneumatic tires, it will be appreciated by those skilled in the art that the invention herein is applicable to a broad range of elastomeric products in which customization is desired.

DISCLOSURE OF INVENTION

In light of the foregoing, it is a first aspect of the invention to provide a method and an apparatus for ablative processing of elastomeric products such as tire sidewalls which is given to the formation of high resolution decorative and/or informational designs and configurations on such products.

Another aspect of the invention is the provision of a method and an apparatus for ablative processing of elastomeric products which is highly flexible, given to the generation of a broad range of designs and/or configurations on elastomeric products such as tire sidewalls.

Still a further aspect of the invention is the provision of a method and an apparatus for ablative processing of elastomeric products which is of a non-contacting nature.

An additional aspect of the invention is the provision of a method and an apparatus for ablative processing of elastomeric products which allows for generation of multicolored and/or textured designs and/or configurations which may be presented in relief.

Still a further aspect of the invention is the provision of a method and an apparatus for ablative processing of elastomeric products which allows for custom design of decorative features on such products.

Still a further aspect of the invention is the provision of a method and an apparatus for ablative processing of elastomeric products which allows for ease of addition of informational data to such products.

Yet another aspect of the invention is the provision of a method and an apparatus for ablative processing of elastomeric products which is cost effective to implement with state-of-the-art apparatus and techniques.

The foregoing and other aspects of the invention which will become apparent as the detailed description proceeds are achieved by an ablation system for imparting informational and/or decorative configurations upon a tire, comprising: a tire; laser means in juxtaposition to said tire for generating a laser beam of light energy; and control means connected to said laser means for directing said laser beam upon particular portions of said tire, said laser beam ablating said particular portions in a predetermined configuration.

Still other aspects of the invention which will become apparent herein are attained by a method for imparting informational and/or decorative configurations upon a tire, comprising: securing a multilayered work piece to the tire; selecting a configuration to be imparted to said tire; impinging a laser beam upon selected areas of said multilayered work piece, said configuration defining said selected areas; and regulating a dwell time of said laser beam upon said selected areas, said laser beam ablating said work piece to selected layers thereof.

DESCRIPTION OF DRAWINGS

For a complete understanding of the apparatus and techniques of the invention reference should be made to the following detailed description and accompanying drawings wherein.

BEST MODE FOR CARRYING OUT THE INVENTION

As presented above, the invention herein relates to the generation of decorative and/or informational designs and configurations in elastomeric products. The apparatus and technique of the invention are presented below with respect to the placement of such designs or configurations on tire sidewalls. However, those skilled in the art will appreciate that the concept of the invention extends to a broad range of elastomeric products, such as air spring sleeves, rubber articles, and the like.

Figure 1:
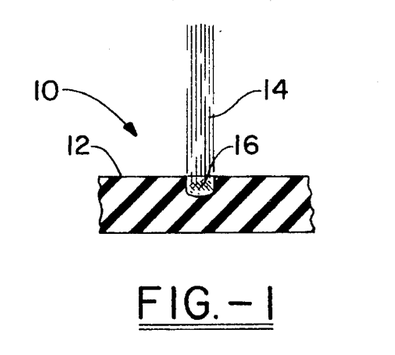
FIG. 1 is an illustrative view of a laser ablation system in partial cross section.

Referring now to the drawings, and more particularly to FIG. 1, it can be seen that a laser ablation system is shown generally by the numeral 10. In such a system, a work piece 12, here an elastomeric product of rubber or the like, is impinged by a laser beam 14 such that an ablated region 16 is affected. The laser of the type employed herein is understood by those skilled in the art to be of the Nd:YAG, $CO_2$, excimer or other appropriate type. It should also be understood that the mode of laser operation may vary, including both continuous wave and pulsed beam generation. $CO_2$ and YAG lasers operate in the infrared range, having characteristic wavelengths on the order of 10 μm and 3 μm, respectively, while excimer lasers operate in the ultraviolet range, having a characteristic wavelength of less than 300 nm. In general, excimer lasers are capable of removing material by ablation, rather than by thermal activities such as vaporization, evaporation, or melting of the impinged media as when YAG or $CO_2$ lasers are employed. In many cases, ablative processing using excimer lasers attains a higher degree of precision than may be attained with YAG or $CO_2$ laser processing or, for that matter, other types of processing in general. Of course, within the context of the invention the specific type of laser employed will typically be a function of the specific material being processed. It has been found that Nd:YAG and $CO_2$ lasers perform extremely well with the elastomeric materials of interest herein. Additionally, those lasers provide additional benefits with respect to cost and processing time.

Elastomeric material of the type employed in the manufacture of pneumatic tires typically exhibits a very high absorption coefficient in the ultraviolet range. Consequently, when such materials are irradiated by an excimer laser, most of the energy from the laser is absorbed in a very thin surface layer. It is this surface layer, typically having a thickness on the order of 0.1–0.5 microns, which is ablated. The ablation process is typically achieved by a breaking of the molecular bonds of the elastomeric media, such breaking being the result of the absorbed photon energy. Using an excimer laser in the process of FIG. 1, the material in the ablated region 16 is removed layer-by-layer on a pulse-by-pulse basis of the impinging laser beam 14. Since each layer has a depth of only about 0.1–0.5 microns, very fine control of the depth of cut may be attained by this process. Since the energy of the pulses of the excimer laser beam 14 is used for bond breaking and ejecting ablated material from the work piece or substrate 12, little thermal diffusion to surrounding areas occurs, eliminating melting, scorching, or otherwise disfiguring the areas contiguous to the ablated region 16. Consequently, a high degree of precision may be attained in removal of the ablated material with an absence of typical side effects associated with thermal processing. As presented above, the laser beam 14 is preferably of the Nd:$CO_2$ or YAG type. In such a case, some of the material in the region 16 is removed by vaporization or evaporation while particulate matter is ejected during the process. By tailoring the power of the laser beam 14 to the material to be impinged, and by further controlling the dwell time of the laser beam 14 with the material of the substrate 12, undesired melting or scorching can be eliminated. Other beam characteristics may also be tailored for such purposes, including pulse width, pulse rate, and beam shape.

In accordance with the concept of the invention, the absorption or ablation energy to a work piece is defined by $A=I/I_o$, where A is the energy of ablation, $I_o$ is the energy into the work piece represented by the impinging laser beam, and I is the output energy passing through the work piece. It has been found that A is a function of the type of material employed for the work piece, differing with the molecular structure thereof and the associated fillers employed. Additionally, A is a function of the wavelength of the laser employed to impinge the work piece. Consequently, the invention contemplates the provision of a pneumatic tire or other elastomeric product having a layered region to be ablated for customizing by the addition of decorative and/or informational designs and configurations. The particular nature of the layer region will necessarily be chosen with due consideration given to the type of laser employed for the ablation process.

Figure 2:
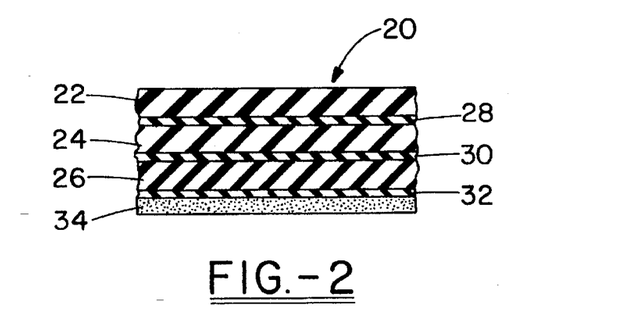
FIG. 2 is a cross sectional view of a multilayered work piece or applique according to the invention.

Referring now to FIG. 2, it can be seen that a work piece or layered laminate according to the invention is designated generally by the numeral 20. As will become apparent below, the work piece 20 may take on any of various geometric configurations. In any event, when employed with a pneumatic tire, the work piece 20 will be suitably adapted for adherence thereto. In a representative embodiment of the invention, the work piece 20 comprises a first outer layer 22 which may be made of typical sidewall veneer stock and comprises a carbon black filled elastomeric material such as rubber. An intermediate layer 24 of elastomeric material is also provided. The layer 24 is preferably of a color which contrasts the color of the outer layer 22. In some embodiments, the layer 24 may be white, of typical "whitewall" stock which may be pigmented or dyed, it being understood that any of various colors, including black, may be employed. If desired, yet a further layer or bottom layer 26 may also be employed in the laminated work piece 20. In one embodiment of the invention, the layer 26 is of an elastomeric material having a color different from that of the layer 24 and, in most cases, also different from the color of the outer layer 22 which is typically black. Those skilled in the art will appreciate that appropriate barrier layers 28, 30 may optionally be interposed between the layers 22, 24 and 24, 26 respectively. Such barrier layers are interposed to prevent staining resulting from migration or bleeding from one layer to the next or from the sidewall stock.

It should be readily appreciated that the specific nature of the laminated work piece 20 may vary depending upon the implementation desired. The work piece 20 may be single layered or multilayered, in the latter instance two or more layers being employed. The number of layers employed will typically be a function of the number of contrasting colors desired in the ultimate design or configuration and/or the relief or three-dimensional effect to be achieved. The variations of the various available structures of the laminated work piece 20 are further highlighted by the selectable inclusion of an adhesive layer 34 at a bottom surface thereof. In the embodiment shown, the adhesive layer 34 is attached to the bottom layer 26 and is provided for bonding the work piece 20 to the sidewall area of the pneumatic tire. Preferably, a barrier is interposed between the adhesive layer 34 and the bottom layer 26. In such an embodiment, the work piece 20 would typically be bonded to a cured tire after the tire manufacturing process has been completed. Such a process allows for a typical "black wall" tire to be converted to one having decorative features thereon. It is also contemplated that the work piece 20 may be bonded to the sidewall of the tire during the tire curing process. In such an instance, the work piece 20 would typically be placed within a recess in the green tire to be vulcanized thereto during tire cure. If such a technique is employed, the adhesive layer 34 would be eliminated, although the barrier layer portion would remain. Whether the work piece 20 is bonded to a cured tire or bonded thereto during the tire curing process, it is contemplated that the decorative applique or work piece 20 may be laser engraved or ablated either prior to such bonding or thereafter. It is further contemplated that the work piece 20 may be structurally integrated into the sidewall of the tire in much the same manner as decorative sidewall bands have previously been interposed. While such a technique is typically not desirable due to the complexity of the necessary operations, such a method and technique for inclusion of the work piece 20 within the tire is contemplated as a portion of the instant invention.

Irrespective of the method of adherence of the work piece 20 to the pneumatic tire, it is contemplated in an embodiment of the invention that each of the layers 22, 24, 26 of the work piece 20 demonstrates a different absorption factor A to an impinging laser beam. Accordingly, each of the layers 22, 24, 26 will demonstrate a different composition or molecular structure or implementation of fillers or the like such as carbon black, calcium carbonate, or silica. The differing composition or molecular structures of the elastomeric materials or the utilization of different fillers therein will result in a different response by each of the layers 22, 24, 26 to an impinging laser beam of fixed frequency. In the preferred embodiment of the invention, the layer 22 is contemplated as being most responsive to the impinging laser beam, demonstrating a higher absorption factor A, while the bottom layer 26 demonstrates the lowest absorption factor A and the intermediate layer 24 is characterized by an absorption factor A lying therebetween. Consequently, the ablation energy represented by the impinging laser beam upon the work piece 20 will have a most immediate effect on the outer layer 22 for any fixed dwell time, while the lowermost layer 26 will have the least response. As will be appreciated later herein, such selection of materials assures that as the laser beam is brought into engagement with the laminate 20 from the side of the outer layer 22, the ablation of each exposed layer will not adversely impact the subsequent layer. In other words, after the exposed layer is ablated, any impingement of the laser beam upon the subsequent layer for any short duration of time will not be sufficient to disturb, mar, or otherwise distort the subsequent layer.

Figure 3:
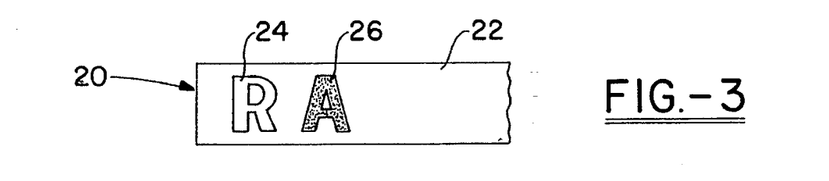
FIG. 3 is a top plan view of the work piece or laminate of FIG. 2.

As shown in FIG. 3, by controlling the movement of the laser beam 14 upon the work piece 20, various configurations may be ablated. Additionally, by controlling the dwell time or rate of scan of the laser beam 14 upon the work piece 20, various depths of ablation may be attained. Of course, the depth of ablation may also be controlled by repetitive scans, rather than single scans at increased dwell time. In either event, and as shown in FIG. 3, the letter "R" is formed by ablation of the outer layer 22 and barrier layer 28 (if employed) to expose the intermediate layer 24. The letter "A" is formed by ablating the outer layer 22, intermediate layer 24, and barrier layers 28, 30 (if employed) to expose the bottom layer 26. Of course, by controlling the beam 14, rate of scan, dwell time, and the like, any of numerous configurations in complimentary and/or contrasting colors and dimensional relief may be attained. Since each pulse of the laser beam 14 ablates the impinged area to a depth which is determined by the characteristics of the material of the layer and the energy characteristics of the laser beam, extremely accurate depths of ablation can be attained. It is also contemplated that different types of lasers may be employed to engrave the various layers of the work piece 20. For example, a $CO_2$ laser may be used to remove the outer layer 22, while a YAG laser is used to remove the next layer 24, imparting a texture or pattern to the final layer 26.

Figure 4A:
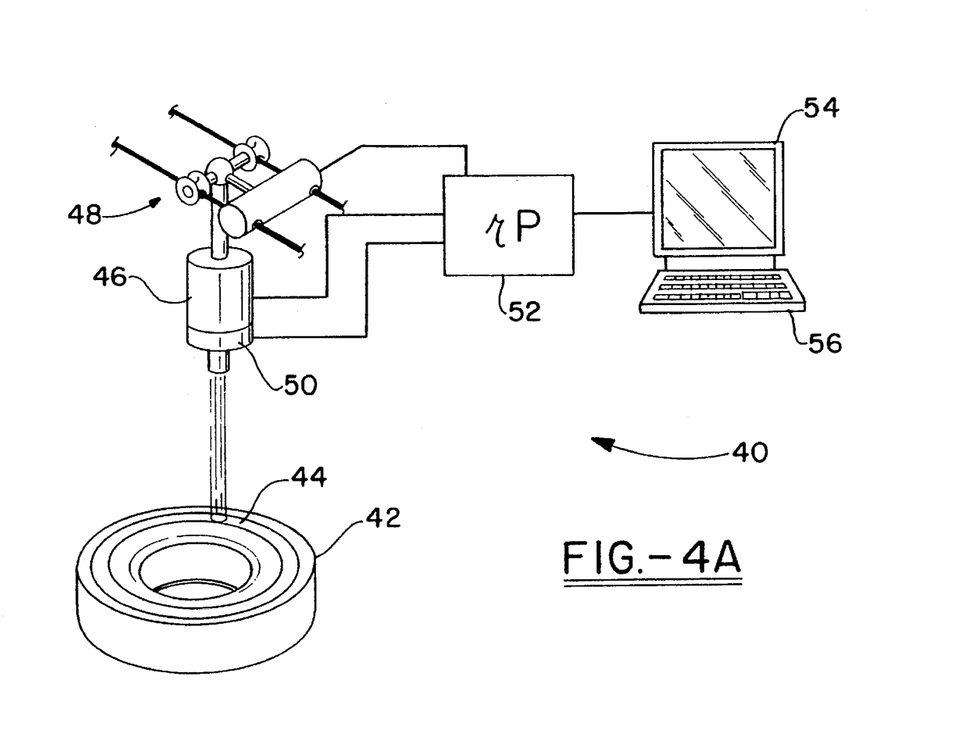
FIG. 4A is a schematic diagram of an ablation system according to a first embodiment of the invention.

With reference now to FIG. 4A, it can be seen that a tire ablation system according to a first embodiment of the invention is designated generally by the numeral 40. A tire 42 is provided with a work piece 44 upon the sidewall thereof. In the embodiment shown, the work piece 44 is in the form of a ring or band which is either adhesively secured or vulcanized to the sidewall. While the band 44 may be of any of various configurations, it is preferred that the outer or exposed surface thereof be of black tire stock rubber such that if the tire 42 is to remain as a "black wall" tire, no ablation of the work piece 44 is necessary. If the tire is to be capable of being modified as a "whitewall" tire, the band 44 may simply comprise a two layer laminate, with the outer layer being a black rubber stock and the inner layer being a white sidewall stock. Of course, additional layers may be provided for the laminate of the work piece 44 to provide additional flexibility for customizing the tire. If the tire 42 is to be configured as a standard "whitewall" tire with a single white band thereabout, ablation of a ring of the outer rubber material to expose the inner white layer would be necessary. Of course, multiple concentric rings might be ablated, or any of numerous decorative configurations, letters, or logos might be imparted.

The ablation of the work piece 44 is achieved by means of a laser system 46 capable of generating a laser beam of suitable wavelength and power to achieve the desired ablation. Those skilled in the art will appreciate that conventional lasers of the $CO_2$, YAG, or excimer type may be employed. The laser system 46 is maintained upon a pair of tracks 48 which are maintained above and in juxtaposition to the tire 42. Accordingly, the laser 46 may be translated in orthogonal directions over the tire 42 such that the beam of the laser 46 may be caused to impinge upon selected areas of the sidewall of the tire 42, and particularly upon the work piece 44. With the tracks 48 providing means for directing the laser beam in a two coordinate system, the lens 50 of the laser 46 is provided to accurately focus the beam.

As a portion of the ablation system 40, a microprocessor 52 or other suitable control system is provided. In standard fashion, a display screen 54 and a keyboard 56 are provided in association with the microprocessor 52 to provide for ease of communication. As shown, the microprocessor 52 interconnects the tracks 48 to provide for the translating of the laser 46 and the casting of the laser beam in the two coordinate system. The microprocessor 52 also serves to control the focusing the lens 50 and the excitation of the laser 46. Indeed, the microprocessor 52 serves to control all of the operation parameters of the ablation system 40, including, by way of example, the dwell time of the laser beam upon the work piece 44, the power of the laser beam, the number of passes over any particular portion of the work piece, and the actuation and deactuation of the laser itself. The keyboard 56 allows an operator to select any of a multitude of predetermined configurations which might be imparted into the work piece 44. Of course, it is also contemplated that the keyboard 56 may allow the operator to generate independent configurations as well. The microprocessor 52 controls not only the positioning of the laser beam from the laser 46, but also the dwell time of the laser upon the sidewall of the tire 42 or the laminate 44 to assure appropriate ablation. Under control of the microprocessor 52, the laser beam tracks upon the work piece 44 the appropriate configuration, ablating the desired areas to expose the remaining areas, thus providing the desired decorative feature.

Figure 4B:
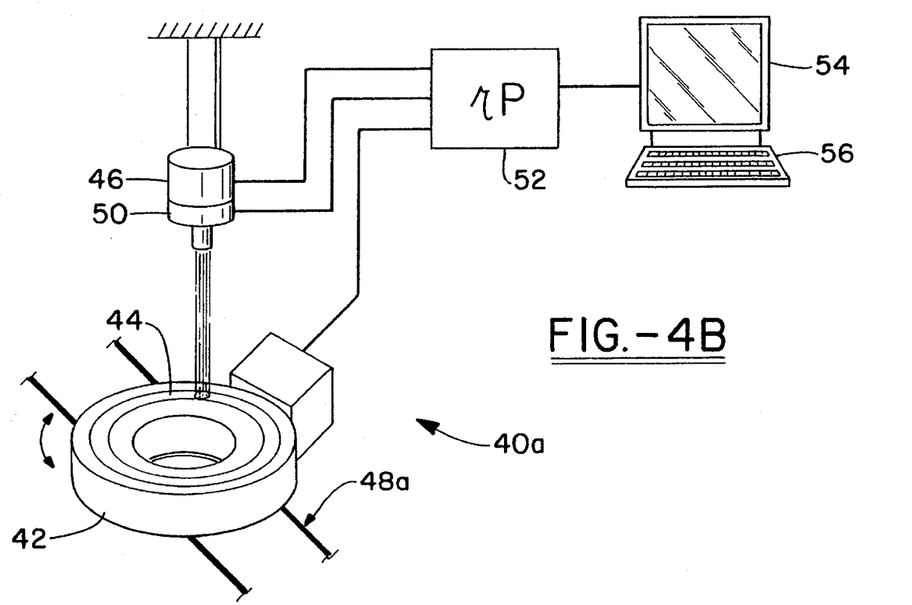
FIG. 4B is a schematic diagram of an ablation system comprising a variation on the theme of the invention shown in FIG. 4A.

In the embodiment of FIG. 4A, it is contemplated that the tire 42 will remain stationary beneath the translating laser 46. However, it will be appreciated that the tire 42 might be mounted upon a transitional system which further achieves the desired impingement of the laser beam. As shown in FIG. 4B, the tire ablation system 40a is substantially identical to the system 40 of FIG. 4A, but for the apparatus and technique for achieving relative translational movement between the tire 42 and the laser 46. In the system 40a, the laser 46 is fixed and the tire 42 is translatable upon the tracks 48a under control of the microprocessor 52. Accordingly, the tire 42 is caused to translate in the fixed beam of the laser 46. In all other respects, the system 40a is substantially identical to the system 40.

Figure 5:
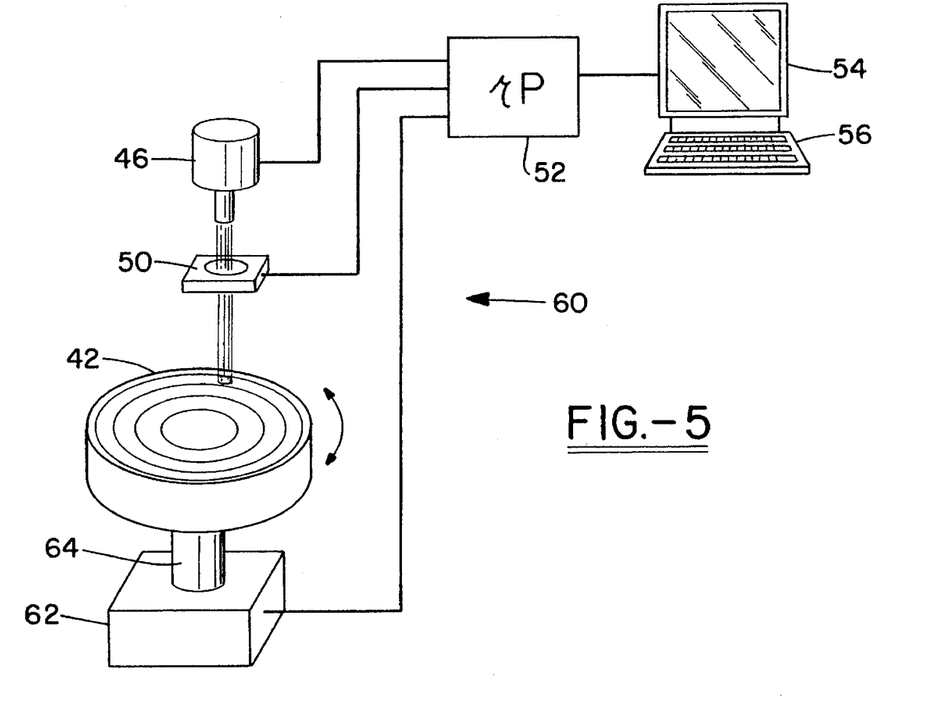
FIG. 5 is a schematic diagram of an ablation system according to a second embodiment of the invention.

Referring now to FIG. 5, it can be seen that a tire ablation system according to a second embodiment of the invention is designated generally by the numeral 60. In this embodiment, the tire 42 is mounted upon a shaft 64 of the motor 62 such that the tire 42 is rotatable about its central axis. Positioned above the rotatable tire 42 is the laser system 46 presenting a laser beam through a lens 50 upon the sidewall of the tire 42. As in the embodiment of FIGS. 4A and 4B, a microprocessor 52 and associated display screen 54 and keyboard 56 are provided as the control mechanism. The microprocessor 52 is adapted to control the lens 50 such that the laser beam from the laser system 46 is movable with respect to the sidewall of the tire. Additionally, the microprocessor 52 is adapted to control the rotational position of the tire 42 by controlling an appropriate servo or .stepping motor 62 to rotationally index the tire.

It is contemplated that a work piece 20 might be applied to the sidewall of the tire 42 in the tire ablation system 60. It is also contemplated that the invention may not require the utilization of any such work piece. For example, if data respecting the tire is desired to be ablated into the tire itself, the microprocessor 52 may simply control the motor 62 and lens 50 to present such identifying data directly into the sidewall of the tire 42 at the necessary rotational and radial locations. Of course, the lens and motor 62 can be controlled concurrently or independently to achieve any desired configuration. In one embodiment of the invention, a bar code is ablated into the sidewall of the tire 42, while in other embodiments, serial numbers, the owner's name, or other such indicia are imparted.

Figure 6:
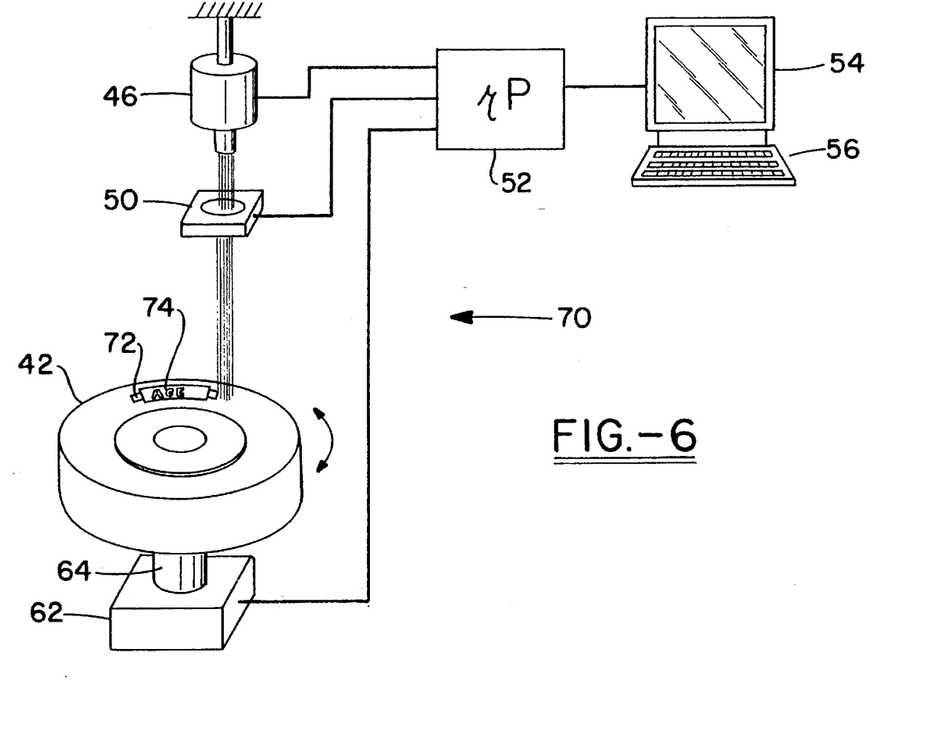
FIG. 6 is a schematic diagram of an ablation system according to a third embodiment of the invention.

Still a further tire ablation system is designated generally by the numeral 70 as shown in FIG. 6. This embodiment, much like the embodiment shown in FIG. 5, employs the microprocessor 52 to direct the laser beam upon the tire 42 by control of the lens 50 and motor 62. In this embodiment, however, the sidewall of the tire 42 is provided with a suitable work piece 72 which may be multilayered such as the laminated work piece 20. In this embodiment, a mask 74, substantially impervious to and unaffected by the imparted laser, is laid over the work piece 72 with the desired configuration therein. A broad beam of laser energy or a raster scan may then be directed under control of the microprocessor 52 from the laser system 46, through the lens 50, and through the mask 74 onto the work piece 72. The dwell time of the laser beam upon the work piece 72 may be controlled by the rate of rotation or indexing by the motor 62, and/or through appropriate control of the lens 50. Focusing of the lens 50 may be employed to attain a desired power density, while the beam itself may be directed using common beam steering techniques.

It will be readily appreciated by those skilled in the art that the laser 46 in any of the embodiments presented herein may be directed and controlled by means of a galvanometer controlling reflective mirrors or the like to direct the laser beam in X-axis and Y-axis orientations. Such "galvo" systems are presently well known.

Figure 7:
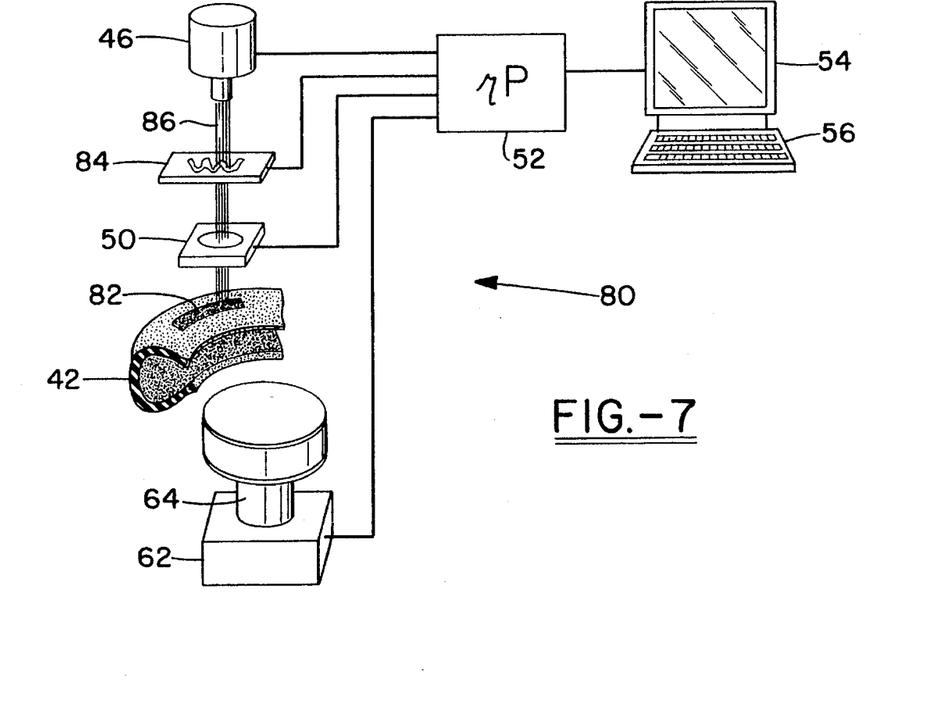
FIG. 7 is a schematic diagram of an ablation system according to a fourth embodiment of the invention.

Yet another embodiment of the invention is designated by the numeral 80 in FIG. 7, the same employing a work piece 82 maintained upon the sidewall of the tire 42 which is rotatable by means of a motor 62 receiving the shaft 64. In this embodiment, a mask 84 is interposed within the laser beam 86 between the laser system 46 and the lens 50. The laser thus impinges upon the work piece 82 in the form of the mask, ablating the necessary surface portions of the work piece 82 to expose the desired decorative or informational configurations or designs. Again, an appropriate microprocessor 52 controls the motor 62, lens 50, and laser system 46. If needed, it will be understood that the microprocessor 52 may also control positioning of the mask 84.

Figure 8:
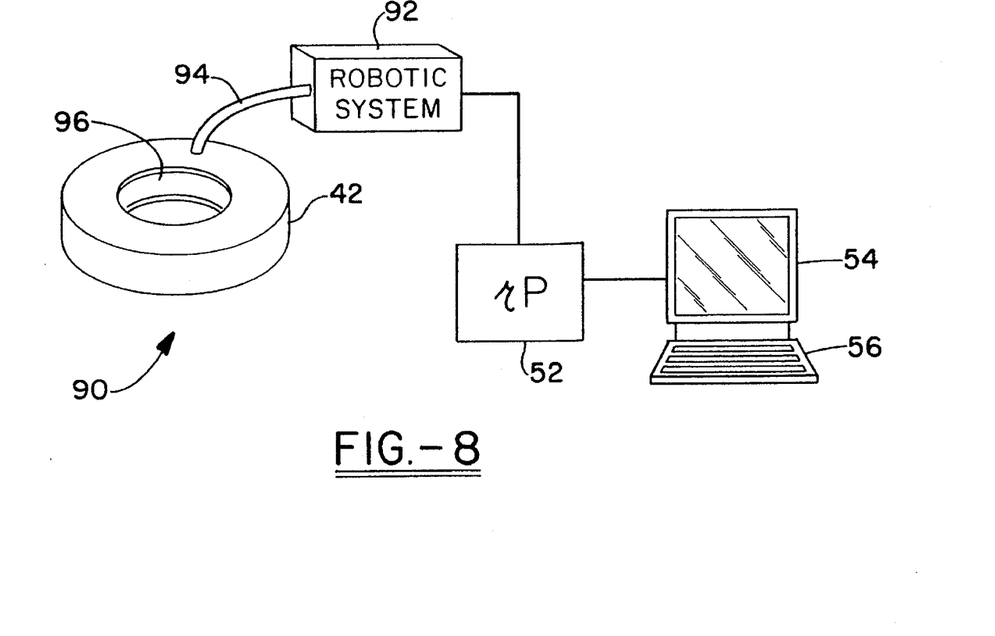
FIG. 8 is a schematic diagram of an ablation system according to a fifth embodiment of the invention.

Still another embodiment of the invention is shown in FIG. 8 and designated by the numeral 90. Again, a tire 42 is subjected to an appropriately controlled laser beam for the ablation of decorative or informational data thereon. Here, the microprocessor 52 communicates with the keyboard 56 and display screen 54 to achieve the desired ablation which, in this embodiment, is achieved through a robotics system 92 of any appropriate nature. Of particular interest here, a fiber optic element 94 passes the laser beam to the tire 42. With the fiber optic element 94 under control of the robotics system 92 and microprocessor 52, the laser beam can be impinged on nearly any surface of the tire. Particularly, the flexibility of the fiber optic element 94 may allow entry of data to the interior of tire envelop by entry through the tire annulus 96.

Figure 9:
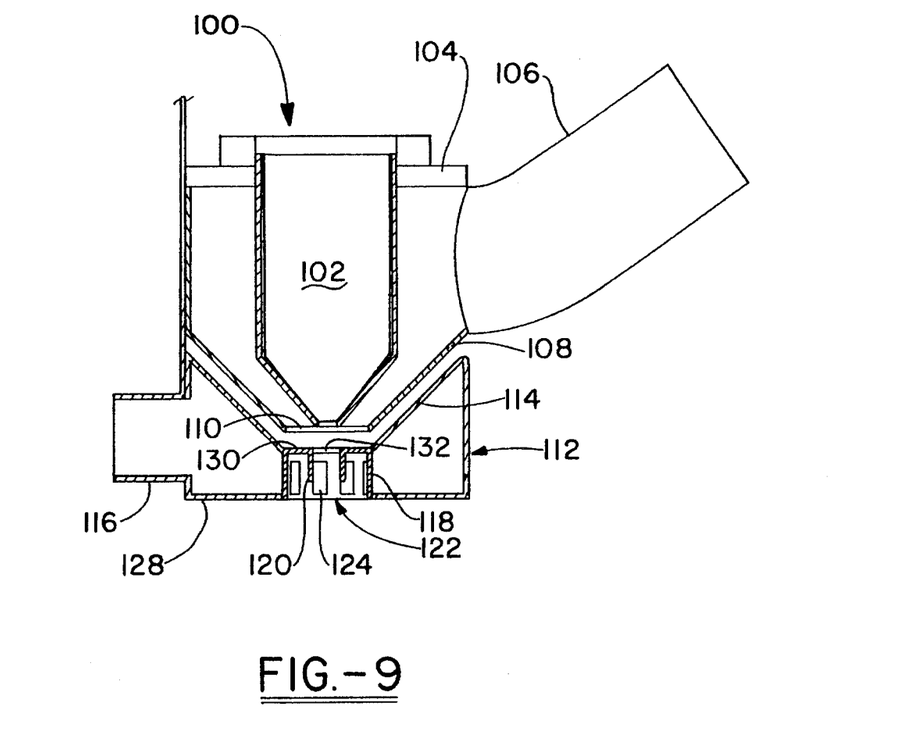
FIG. 9 is a cross sectional view of a vacuum exhaust fixture employed according to the invention.

An important feature of the instant invention is the removal of the ablated or excised material from the work surface during the ablation process. As discussed above, impingement of the laser beam upon the elastomeric material causes some of the material to evaporate or vaporize, while other of the particulate material must be ejected from the work piece such that the laser can impinge upon an unobstructed area. Accordingly, a vacuum exhaust fixture 100, as shown in FIG. 9, is preferably employed. As illustrated, the laser head 102 is centrally received within a vacuum shroud 104 which is interconnected through a vacuum tube 106 to an appropriate vacuum source. A conical base 108 is provided at the bottom of the vacuum shroud 104 and substantially coplanar with the beam-emitting portion of the laser head 102. A circular opening 110 is provided at the bottom on the conical base 108, such that the base 108 is substantially truncated. The opening 110 allows for an annular area through which ablated particulate material may pass to the vacuum source through the vacuum tube 106. The structure just described has previously been known in the art, but it has been found that the same has typically been insufficient to allow for complete evacuation of ablated material. Accordingly, the invention contemplates the provision of a cylindrical housing 112 having a truncated conical top portion 114 which is adapted to nestingly receive the conical base 108 of the vacuum shroud 104. The housing 112 communicates through a vacuum tube 116 with an appropriate vacuum source (not shown). An inner cylindrical housing 118 extends from the conical top plate 114 to a bottom plate 128. An annular top plate 130 extends across a top portion of the cylindrical inner housing 118, and is provided with a central opening 132, through which the laser beam must pass, and from which certain of the ablated material may be evacuated by means of the vacuum source applied to the vacuum tube 106. Extending downwardly from the annular top plate 30 and about the opening 32 is a cylindrical baffle 120, stopping short of the base plate 128. The bottom on the inner housing 118 is open, such that the base plate 128 is of an annular nature. Additionally, apertures 124 are circumferentially spaced about the inner housing 118.

It will be appreciated that with the same or different vacuum sources connected to the vacuum tubes 106, 116, there is substantial assurance that ejected particulate material will be quickly and efficiently withdrawn from the work piece during the ablation process. The ejected material may either pass upwardly through the opening 122 of the base plate 128 and thence through the openings 132, 110 and into the vacuum shroud 104 for passage along the vacuum tube 106 or, alternatively, the ablated material may pass through the opening 122 and one of the apertures 124, thence into the interior of the housing 112 for passage through the vacuum tube 116.

The implementation of the housing 112 attached to the vacuum shroud 104 assures the positioning of a vacuum source in closer juxtaposition to the work piece than previously attained. Accordingly, the smallest of particulate matter can be withdrawn from the work surface.

It should now be appreciated that the concept of the invention employs the control of a laser for ablating either the surface of a tire or a work piece laminate to impart selected configurations of informational and/or design data thereto. Exact control of the positioning of the ablative laser is achieved by a microprocessor which directs the beam and/or positions the laser or the selected area to be ablated, controls the depth of ablation and, when a multilayered work piece is employed, the depth of ablation may correlate with color and/or desired relief effects. The work piece may be suitably bonded or vulcanized to the tire sidewall.

EXAMPLES

Figure 10:
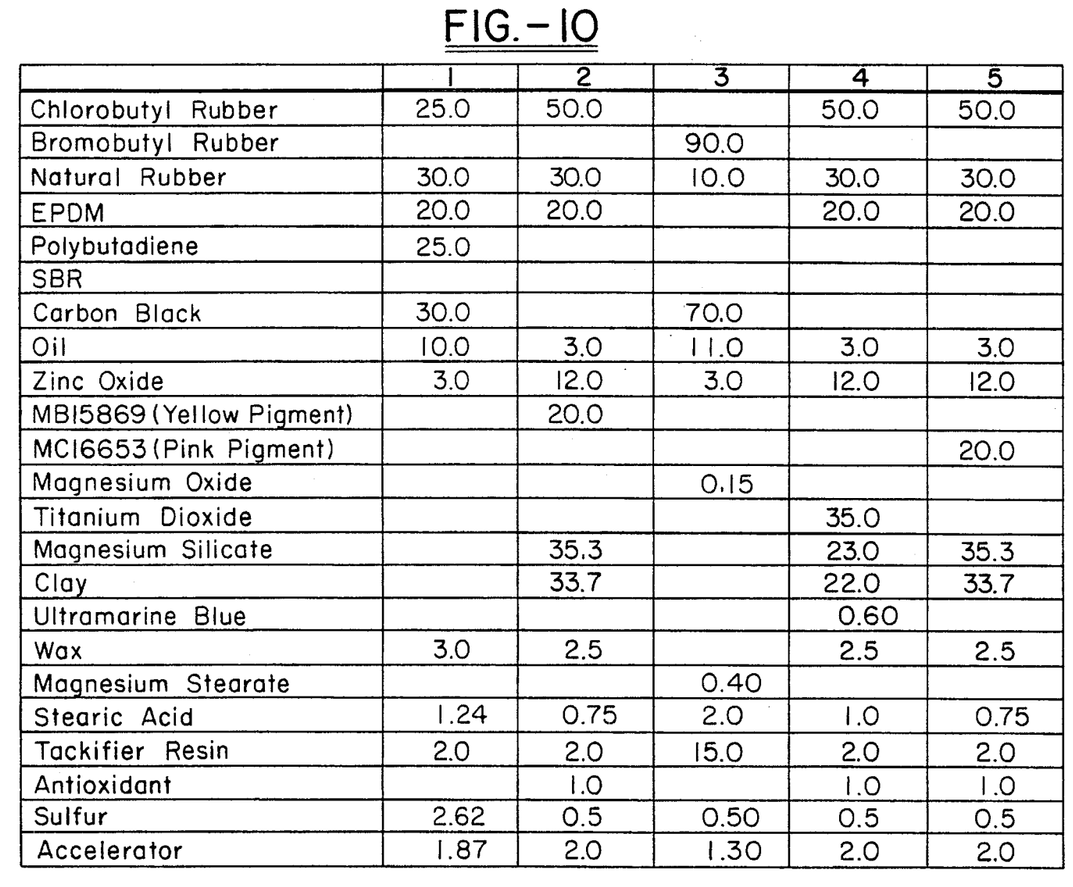
FIG. 10 is a chart of 5 different rubber formulations employed with the examples of the invention.

Using the foregoing apparatus and techniques, the following examples of elastomeric ablation were undertaken. Five different formulations of elastomeric material were employed in the examples, the same being apparent from FIG. 10.

Example 1

A two-layer composite rubber plaque for laser engraving was prepared as follows. The black rubber stock of Formulation 1 was calendered, on standard rubber processing equipment, to a thickness of about 0.015" to serve as the top engraving layer. The yellow rubber stock of Formulation 2 was calendered to a thickness of about 0.085" to serve as the engraving underlayer. The two layers were laminated and subsequently vulcanized in a closed cavity mold for 20 minutes at 165° C. in a standard curing press.

An image of the Firestone logo was successfully engraved into this plaque with an 80 Watt, $CO_2$ laser, Laser-Graver (TM) manufactured by Laser Machining, Inc. The laser was operated in the continuous wave (CW) mode at 20W–40W power. The raster scan technique was used which utilized a low power laser to scan a copy of the image on paper. Data so obtained from the scanned image is then used to direct the operation of the higher power laser for engraving the image into the rubber plaque. The black, top layer was ablated through to reveal the yellow underlayer which was also ablated to an appropriate depth. The clarity and definition of the image so created was excellent.

Example 2

A rubber plaque consisting of a top layer of the yellow stock of Formulation 2 and a black underlayer of stock of Formulation 3 was prepared and engraved by the same procedures described in Example 1. In this case, however, the yellow top layer was ablated through to reveal the black underlayer thus creating the image. The Firestone logo image thus created was of the same excellent quality as in Example 1.

Example 3

An identical rubber plaque as in Example 1 was successfully engraved using a Nd:YAG laser operating in the beam steering configuration. The laser, InstaMark Signature (TM), is manufactured by Control Laser Corp. In this case the laser operated at 30W power and a q-switch pulse frequency of 50 and 10 KHz. Three successive passes at 30W were made, followed by a final pass at low power. The clarity and definition of the Firestone logo image thus created was excellent.

Example 4

A rubber plaque composed of a top layer of the black stock of Formulation 1 and an underlayer of the white stock of Formulation 4 was successfully engraved using the same $CO_2$ laser configuration as described in Example 1. In this case, however, the laser was operated at 25W and two successive passes were delivered to create the image. The black top layer was ablated through to reveal the white underlayer. A lens with a focal length of 2.5" was employed. The laser beam diameter at the focal point was estimated to be 0.007", and the beam overlap distance was estimated to be 0.004". Images of the Ford, Saturn, Toyota and Firestone logos were engraved. Using the same technique, the logos were engraved into a plaque identical to that as described in Example 1. The clarity and definition of the images thus created were excellent.

Example 5

A sidewall section from a conventional tire of size P235/75R15 was successfully laser engraved using an 80W, $CO_2$ laser (C-80) manufactured by Laser Machining, Inc. This laser configuration utilizes a computer-numerical-control (CNC) table on which the tire sidewall section is maneuvered under the laser beam. The motion of the table was programmed from data collected by digitizing a paper copy of the image. The image consisted of lettering of the word FIRESTONE.

The construction of the area of the sidewall section used for engraving consisted of a top (veneer) layer of the black stock of Formulation 1 and an underlayer of the white stock of Formulation 4. The veneer layer was ablated through to reveal the white underlayer which was also ablated to an appropriate depth. For this purpose, the laser was operated in the pulsed mode with a pulse width of 0.5 ns. Two traces of the laser beam were made; a first trace at a power setting of 45W and a final trace at a power setting of 10W. A 2.5" focal length lens was used; beam overlap was 0.007". The fine quality image so achieved demonstrates the technological feasibility of laser engraving of tire sidewalls.

Example 6

A sidewall section area consisting of black veneer stock of Formulation 1 and yellow underlayer stock of Formulation 2 was successfully laser engraved as in Example 5 except that, the first beam trace was carried out at 55W and the final trace was carried out at 15W. This sidewall section was from a conventionally manufactured tire of size P195/70R14.

Example 7

A sidewall section area consisting of black veneer stock of Formulation 1 and pink underlayer stock of Formulation 5 was successfully laser engraved as in Example 5 except that, the first beam trace was carried out at 60W and the final trace was carried out at 20W. This sidewall section was from a conventionally manufactured tire of size P195/70R14.

Example 8

The sidewall area of a conventional tire of size P195/70R14 was successfully laser engraved using a laser configuration as in Example 5. The first beam trace was carried out at 65W and the second at 20W. The sidewall engraving layers consisted of black veneer stock of Formulation 1 and white underlayer stock of Formulation 4.

Example 9

Laser engraving of a bar code on a rubber applique was undertaken with an 80W, $CO_2$ laser operating at 40W delivery to the sample. A raster scan technique was employed. The bar code was engraved through a black layer made in accordance with Formulation 1 to an underlying white layer made according to Formulation 4.

Example 10

The process of Example 9 was undertaken in employing an Nd:YAG laser having a power of 20W–40W. Again, the bar code was successfully ablated through the black layer of Formulation 1 to the white layer of Formulation 4.

Thus it can be seen that the objects of the invention have been satisfied by the structures and techniques presented above. While in accordance with the patent statutes, only the best mode and preferred embodiment of the invention have been presented and described in detail, it is to be understood that the invention is not limited thereto or 5thereby. Accordingly, for an appreciation of the true scope and breadth of the invention reference should be made to the following claims.

What is claimed is:

1. A method for imparting informational and/or decorative configurations upon a tire, comprising:

securing a multilayered work piece to the tire, said layers of said work piece being of elastomeric material and having associated ablation rates with respect to laser beams of light, and wherein a first outer layer has a greater ablation rate than a second inner layer of said work piece;

selecting a configuration to be imparted to said tire;

impinging a laser beam upon selected areas of said multilayered work piece, said configurations defining said selected areas; and regulating a dwell time of said laser beam upon said selected areas, such laser beam ablating said work piece to selected layers thereof.

2. The method according to claim 1, further comprising a step of rotating the tire about an axis, said rotation exposing said selected areas to said laser beam.

3. A method for imparting informational and/or decorative configurations upon a tire, comprising:

securing a multilayered Work piece of elastomeric materials to the tire;

selecting a configuration to be imparted to said tire;

impinging a laser beam upon selected areas of said multilayered work piece, said configurations defining said selected areas;

regulating a dwell time of said laser beam upon said selected areas, such laser beam ablating said work piece to selected elastomeric layers thereof; and altering the type of said laser beam as it impinges said selected areas to effectuate different types of ablation at different ones of said elastomeric layers of said work piece, thereby imparting textures and patterns to resultant exposed surfaces of said elastomeric layers of said work pieces.

4. An ablation system for imparting informational and/or decorative configurations upon a tire, comprising:

a tire;

laser means in juxtaposition to said tire for generating a laser beam of light energy;

control means connected to said laser means for directing said laser beam upon particular portions of said tire, said laser beam ablating said particular portions in a predetermined configuration; and wherein said laser means comprises multiple laser sources of different types and said control means activates selected ones of said laser sources for progressively ablating said particular portions and wherein said particular portions of said tire are within a work piece received by said tire, said work piece comprising a plurality of layers of elastomeric material, said control means activating selected ones of said laser sources to ablate selected ones of said layers.

5. An ablation system for imparting informational and/or decorative configurations upon a tire, comprising:

a tire;

laser means in juxtaposition to said tire for generating a laser beam of light energy;

control means connected to said laser means for directing said laser beam upon particular portions of said tire, said laser beam ablating said particular portions in a predetermined configuration; and wherein said particular portions of said tire are within a work piece bonded to said tire, said work piece comprising at least, three layers, said layers having associated ablation rates with respect to said laser beam, and wherein a first outer layer has a greater ablation rate than a second inner layer of said work piece and said second inner layer has a greater ablation rate than a third inner layer, said second inner layer being interposed between said first outer layer and said third inner layer.

6. The ablation system according to claim 5, wherein said control means regulates a dwell time of said laser beam upon said particular portions of said tire.

7. The ablation system according to claim 6, wherein said layers are of different colors.

8. The ablation system according to claim 7, wherein said first outer layer is black.

9. The ablation system according to claim 7, wherein said control means comprises a pair of tracks receiving said laser means, said laser means being movable upon said tracks.

10. The ablation system according to claim 9, wherein said tire is maintained in fixed position beneath said laser means upon said pair of tracks.

11. The ablation system according to claim 7, wherein said control means comprises a lens interposed in said laser beam between said laser means and said tire.

12. The ablation system according to claim 11, wherein said control means further comprises rotation means receiving said tire and rotating said tire about an axis and within said laser beam.

13. The ablation system according to claim 12, wherein said control means further comprises a mask interposed within said laser beam.

14. The ablation system according to claim 12, wherein said control means regulates a direction and rate of rotation of said tire.

15. The ablation system according to claim 14, wherein said control means regulates said lens to focus said laser beam upon said particular portions of said tire.

16. The ablation system according to claim 7, wherein said work piece is adhesively secured to said tire.

17. The ablation system according to claim 7, wherein said work piece is vulcanized to said tire.

* * * * *